United States Patent
Orndorff, Jr.

[15] 3,637,273
[45] Jan. 25, 1972

[54] ELASTOMERIC BEARING

[72] Inventor: Roy L. Orndorff, Jr., Kent, Ohio

[73] Assignee: The B. F. Goodrich Company, New York, N.Y.

[22] Filed: Jan. 26, 1970

[21] Appl. No.: 5,780

[52] U.S. Cl. .................................308/238, 308/DIG. 12
[51] Int. Cl. ...............................F16c 33/20, F16c 43/00
[58] Field of Search......................308/238, DIG. 12, 237; 287/85 R

[56] References Cited

UNITED STATES PATENTS

| | | | |
|---|---|---|---|
| 2,228,282 | 1/1941 | Miller | 308/236 |
| 3,302,988 | 2/1967 | Senter | 308/238 |
| 3,561,830 | 2/1971 | Orndorff, Jr. | 308/238 |
| 3,008,779 | 11/1961 | Spriggs | 308/238 |
| 3,362,765 | 1/1968 | Pierce | 308/238 |
| 3,382,017 | 5/1968 | Cripe | 308/238 |

Primary Examiner—Edgar W. Geoghegan
Assistant Examiner—Barry Grossman
Attorney—W. A. Shira, Jr. and Harold S. Meyer

[57] ABSTRACT

A tubular bearing insert of elastomeric material for a bearing of the type used for free-flooded marine propeller shafts. The insert has a compressible spring strip of sponge material disposed in a radial slit extending the length of the insert for circumferentially expanding the insert into contact with the bore of the bearing housing. A portion of the tubular wall of the insert is radially deformable with a lug extending outwardly therefrom for releasable engagement with a corresponding recess provided in the bore of the bearing housing in which the insert is to be assembled.

10 Claims, 14 Drawing Figures

INVENTOR.
ROY L. ORNDORFF, JR.
BY
W. A. Shira Jr.
ATTY.

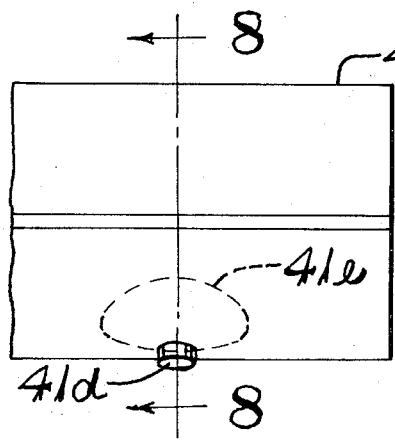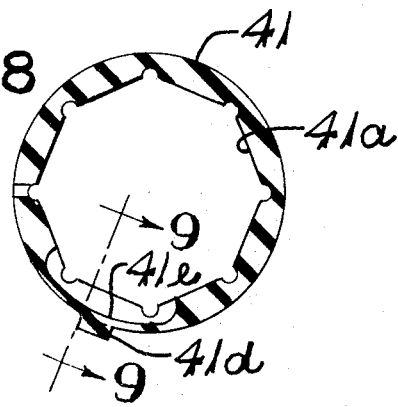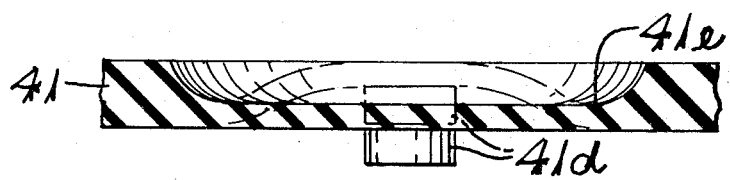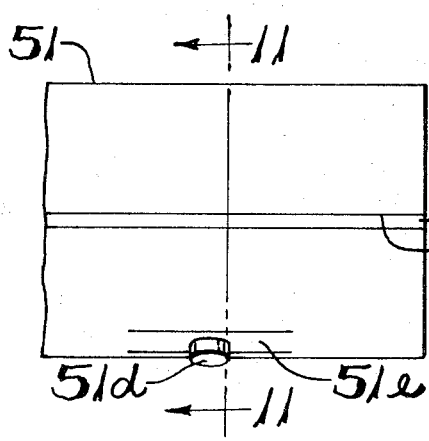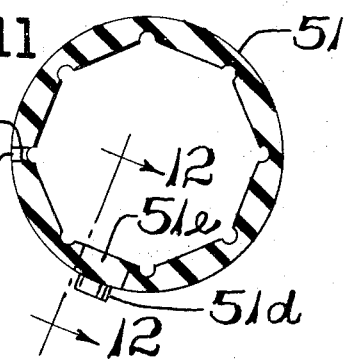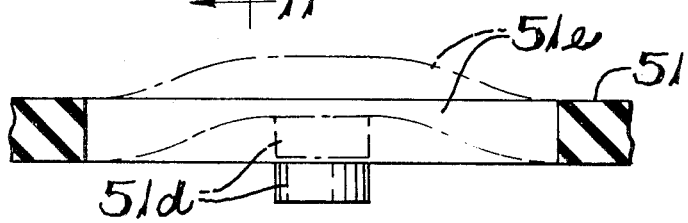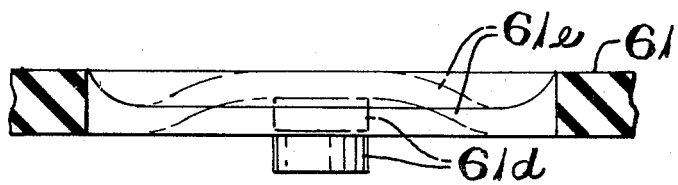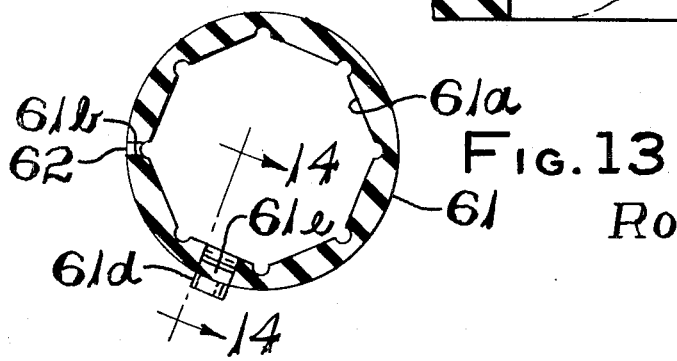

1

ELASTOMERIC BEARING

BACKGROUND OF THE INVENTION

It has often been found desirable to use bearings of the type having elastomeric inserts for marine propeller shafts. Bearings of this type offer the advantage that they may be freely flooded with water to make use of the natural lubrication water provides elastomeric surfaces. A further advantage of the elastomeric bearing for marine propeller shaft usage is found in the ability of the elastomeric bearing to absorb slight misalignment of the shaft with the bearing housing, in a manner which gives the bearing a satisfactory degree of self-alignment.

As mentioned above, the elastomeric bearing may be operated in a freely flooded state. This is usually accomplished by providing longitudinal grooves, or areas of radial relief, intermediate the bearing surfaces so that water may circulate freely longitudinally through the bearing. When a bearing is designed such that it operates longitudinally, or axially, freely flooded, the motion of the vessel provides a natural positive circulation of water through the bearing, thus providing a means of removing foreign particles, which are wiped from the bearing surfaces by shaft rotation, and in addition, provides cooling of the bearing surfaces for the entire length of the bearing.

However, in designing bearings of this type, it has been found difficult to provide convenient and adequate means for retaining the elastomeric material in the bearing housing. Several types of mechanical expedients have been tried including molding or bonding metal locking members to the radially outer surface of the elastomeric material. However, in bearings designed for the smaller range of sizes of marine propeller shafts, such as those encountered in launches and runabouts, it has been found desirable to use a full cylindrical or single piece tubular bearing insert rather than a plurality of longitudinal strips mounted in the bore of the bearing housing. It is in this former type of bearing that the problems of providing releasable attachment in the bore of the bearing housing have proved to be of the greatest degree of difficulty. If the elastomeric insert is inserted in the bearing housing in a manner requiring a longitudinal press fit, such that the elastomeric tube or sleeve is circumferentially compressed as it is inserted in the bearing housing, it is then quire difficult to remove the insert for replacement without dismantling the propeller shaft and removing the shaft from the bearing.

As mentioned above, various mechanical expedients have been tried in order to provide readily releasable assembly of the bearing insert into the housing. However, the more common devices have employed bonding the elastomeric insert to a rigid outer shell which shell is then mechanically locked in the bore of the bearing housing. Providing metal parts bonded to the elastomeric insert requires precise control of difficult manufacturing operations including a high degree of precision and care during the molding of the elastomeric insert and thus render such an insert assembly difficult to manufacture and costly.

SUMMARY OF THE INVENTION

The present invention provides a solution to the above-described problem by providing a simple one-piece elastomeric bearing insert, which is readily assembled and readily releasable from a bore of the bearing housing, and one which does not require metal parts to be bonded or molded integrally with the elastomeric insert.

The elastomeric insert of the present invention employs a locking lug which extends radially outwardly from the outer periphery of insert. A deformable, or depressible, portion is provided in the wall of the bearing insert radially beneath the locking lug. The locking lug is thus depressible radially below the outer periphery of the bearing insert such that the bearing may be assembled longitudinally into the bore of a bearing housing. When the bearing is in its desired position, the locking lug is moved to extend radially outwardly of the outer periphery to engage a corresponding recess provided in the bore of the bearing housing. The locking lug is forced radially outwardly by the resilience of the deformable portion beneath the locking lug.

The deformable portion has the form of a longitudinal tab formed by slitting the wall of the elastomeric insert surrounding the lug portion to thereby form a fully deformable cantilevered tab. An additional radial slit is provided in the wall of the insert, extending longitudinally the length of the insert, with a strip of sponge material provided in the longitudinal slit to permit circumferential compression of the insert when assembled into the bore of a bearing housing. In another embodiment of the invention, the wall of the bearing insert immediately beneath the lug has a radial recess formed in the inner periphery of the bearing insert such that the thickness of the wall immediately beneath the lug is substantially less than that of the remaining portions of the bearing insert. Thus, the lug may be depressed by deforming the thin portion of the insert wall into the recess to enable the insert to be assembled into the bearing housing and yet, the lug will not extend radially inwardly of the bearing surface. Thus, it is possible to assemble or remove the bearing insert from the bearing housing while a shaft is journaled in the bearing. In the preferred form of the invention, a hole is provided radially in the bearing housing to enable the lug to be depressed from the exterior of the housing for releasing the lug to remove the bearing insert.

BRIEF DESCRIPTION OF THE DRAWINGS

FIG. 7 is a portion of a plan view of another embodiment of the elastomeric bearing insert with the insert removed from the housing of FIG. 1;

FIG. 8 is a cross section view taken along section indicating lines 8—8 of FIG. 7 and shows the details of the radial recess formed in the inner periphery of the bearing insert immediately beneath the locking lug;

FIG. 9 is an enlarged portion of a cross section taken along section indicating lines 9—9 of FIG. 8 and shows in further detail the radial recess formed on the inner periphery of the bearing insert immediately beneath the locking lug with the deformed state being shown in phantom outline;

FIG. 10 is a plan view of another embodiment of the elastomeric insert removed from the bore of the bearing housing of FIG. 1 and embodying an alternate form of the deformable longitudinal tab;

FIG. 11 is a cross section taken along section indicating lines 11—11 of FIG. 10 and shows the details of the deformable longitudinal tab;

FIG. 12 is an enlarged portion of a cross section taken along section indicating lines 12—12 of FIG. 11 and shows in further detail the deformable longitudinal tab with the deformed state being shown in phantom outline;

FIG. 13 is a cross section similar to FIG. 11 of an alternative form of the embodiment of FIG. 10 and illustrates the recess formed in the radially inner surface of the deformable longitudinal tab; and FIG. 14 is an enlarged portion of a cross section taken along section indicating lines 14—14 of FIG. 13 and shows in greater detail the details of the radial recess in the longitudinal tab with the deformed state being shown in solid outline and the relaxed state shown in phantom outline.

DETAILED DESCRIPTION

Figure 1:
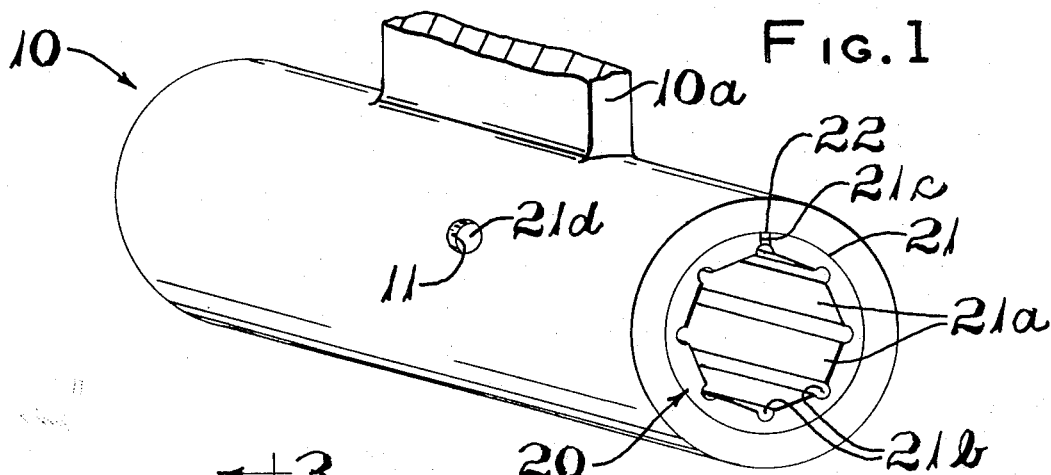
FIG. 1 is an isometric view of the stern tube bearing housing of the marine propeller shaft bearing, with the shaft removed, and showing an elastomeric bearing insert assembled in the housing.

Referring now to FIG. 1, a stern tube bearing housing 10 is shown with a portion of the strut 10a for attachment to the hull of a ship. A cylindrical bearing insert 20 of elastomeric material is shown assembled into the bore of the bearing housing 10. In the preferred form of the invention illustrated in FIG. 1, the elastomeric insert 20 has a plurality of bearing surfaces 21a formed on the inner periphery of the insert with each of the surfaces extending longitudinally the full length of the insert. A radial groove is preferably provided in the wall of the insert intermediate each two adjacent bearing surfaces thereby providing a plurality of grooves, denoted 21b in FIG. 1, spaced about the circumference of the bearing, which grooves serve to provide passage of water through the bearing for cooling. The insert 20 also preferably has a radial slit 21c formed through the wall thereof and extending the length of the insert 20. A strip 22 of material which has a modulus of compression substantially less than that of the insert as, for example, plastic or elastomeric sponge, is provided in the radial slit for the full length thereof to serve as a circumferential compression spring when the insert is assembled longitudinally into the bore of the bearing housing.

In the preferred practice of the invention, the sponge strip 22 is bonded, for example, adhesively to one longitudinal edge of the radial slit 21c after the elastomeric insert has been vulcanized. Thus, the insert may be completely formed and vulcanized as a unitary piece and the sponge strip assembled thereto after vulcanization.

Referring again to FIG. 1, an aperture 11, illustrated as a circular hole, is provided in the wall of the bearing housing preferably in a vertically upper quadrant of the housing, which aperture receives a locking means therein from the bearing insert. In the preferred practice of the invention the locking means is a circular lug 21d extending radially outwardly from the outer periphery in the bearing insert 21 for engagement with the aperture 11. The lug 21d is disposed intermediate the ends of the insert 20 at a location which corresponds in axial spacing from the ends of the insert with the axial spacing of the aperture 11 from the ends of the bearing housing.

The lug 21d is preferably located with respect to the radial slit 21c such that when the insert 20 is assembled into the bore of the bearing housing, the slit 21c is situated at top center of the bearing housing or in a region of lightest shaft loading in an upper quadrant. When the lug 21d is engaged in the aperture 11, the radial slit containing the sponge spring 22 should preferably be vertically lined with the center of the bearing.

Figures 2, 3:
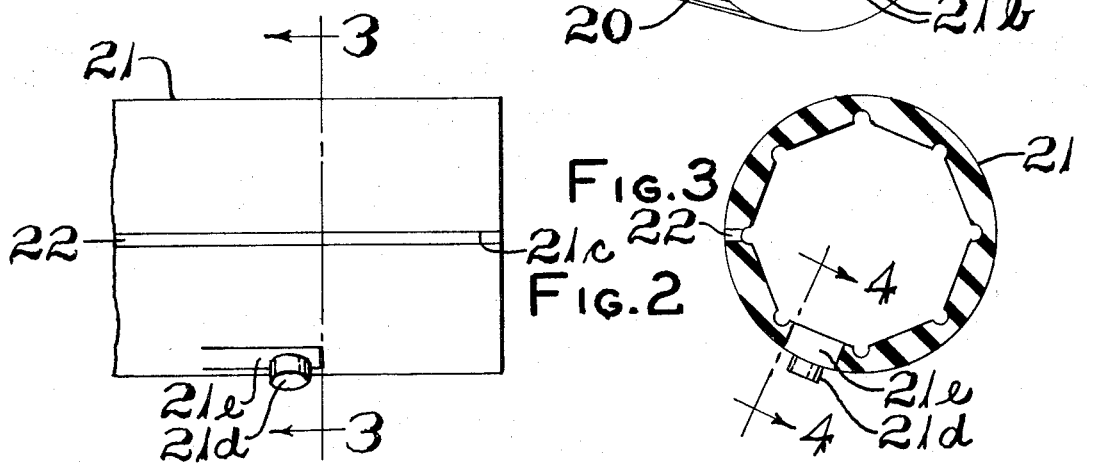
FIG. 2 is a plan view of a portion of the elastomeric bearing insert removed from the bearing housing shown in FIG. 1.
FIG. 3 is a cross section taken along section indicating line 3—3 of FIG. 2 and shows in greater detail the locking lug and deformable cantilevered tab of the preferred embodiment of the invention.

Referring now to FIG. 2, elastomeric insert 20 is shown in plan view removed from the bearing housing. The locking lug 21d is shown extending radially outwardly from a deformable portion 21e formed in the wall of the insert 20. In the preferred form of the invention shown in FIGS. 2, 3 and 4, the deformable portion 21e is a longitudinal cantilevered tab formed by radially slitting the wall of elastomeric insert such that a tab is formed from which the lug 21d extends from the radially outer surface thereof with the lug 21d spaced longitudinally closely adjacent the longitudinally free end of the tab 21e.

Figure 4:
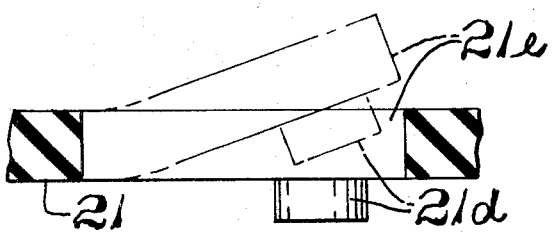
FIG. 4 is a portion of an enlarged cross section taken along section indicating lines 4—4 of FIG. 3 and shows in further detail the deformable cantilevered tab with the depressed state indicated in phantom outline.

Referring now to FIG. 3, the tab 21e, with the lug 21d extending therefrom, is shown in cross section as formed by a pair of longitudinally extending parallel slits in the wall of the insert with the deformed, or depressed, state of the tab shown in phantom outline in FIG. 4. Thus, by pressing radially inwardly on the lug portion 21d, the lug is depressed below the outer periphery of the insert 20 such that the lug portion is no longer in position to engage the aperture in the bearing housing and thus the bearing insert 20 may be moved axially into or out of the bearing housing.

FIG. 4 shows an enlarged portion of the cross section of FIG. 3 giving an axial or longitudinal view of the tab 21e and shows more clearly, by phantom outline, the depressed position of the lug 21d and the tab 21e.

Figure 5:
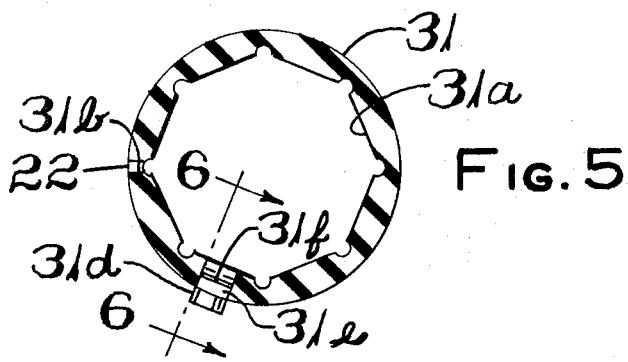
FIG. 5 is a cross-sectional view similar to FIG. 3 and shows an alternative form of the cantilevered tab.

Referring now to FIG. 5, cross-sectional view similar to FIG. 3 is shown illustrating an alternative form of the embodiment of FIG. 2. In FIG. 5, the insert 31 is shown as having a lug portion 31d extending radially outwardly from a longitudinally cantilevered tab 31e formed by radially slitting the wall of the bearing insert. The radially inner surface of the tab 31e has a recess 31f formed therein such that the radial thickness of the tab 31e is substantially less than that of the remaining portion of the elastomeric insert.

Figure 6:
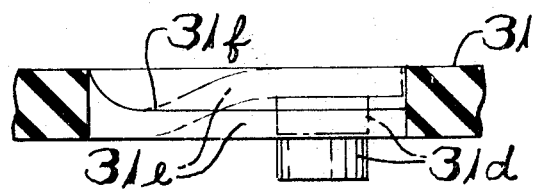
FIG. 6 is a portion of an enlarged sectional view taken along section indicating lines 6—6 of FIG. 5 and shows details of the relieved portion of the cantilevered tab with the deformed state being shown in phantom outline.

Referring now to FIG. 6, an axial cross section of the tab 31e is shown enlarged to illustrate in greater detail the recess 31f. The recess 31f is provided such that the lug 31d may be radially depressed inwardly wherein the outer face of the lug will be radially inward of the outer periphery of the bearing insert 31 with the tab 31e extending radially inwardly only to the inner bearing surface. Thus, the embodiment of FIGS. 5 and 6 permits the locking tab 31e to be depressed for releasing the bearing insert from the bore of the bearing housing while a shaft is journaled in the bearing insert, since the tab need not be depressed radially inwardly of the bearing surface for providing release of the lug from the aperture in the bearing housing.

Referring to FIG. 7, another embodiment in the invention is shown comprising a cylindrical elastomeric insert 41 which is illustrated in FIG. 7 in plan view removed from the bearing housing. The insert 41 has a lug portion 41d, preferably having a circular configuration, extending from the outer periphery of the insert 41 and disposed longitudinally intermediate the ends thereof. The insert has a deformable portion formed in the wall thereof shown by a dashed line in FIG. 7 and shown in more detail in the cross-sectional view in FIG. 8 and the enlarged axial section of FIG. 9 in which the recess 41e is illustrated in solid line. The recess 41e thus provides a radially thin wall to the portion of the insert immediately radially beneath the lug 41d such that the thin walled portion of the insert is easily deformed or depressed radially inwardly by exerting force on the outer face of the lug 41d.

Referring to FIG. 9, the depressed state of the thin wall portion is shown in phantom outline wherein such portion is moved radially inwardly to the inner periphery of the insert 41 in which position the outer face of the lug 41d is radially inward of the outer periphery of the insert 41, thus permitting the lug to be depressed from engagement with the aperture of the bearing housing when the insert 41 moved into or out of the bearing housing while a shaft is journaled in the bearing surfaces 41a. The embodiment of FIGS. 7, 8 and 9 thus provides a deformable portion in the wall of the bearing insert radially beneath the locking lug without the necessity of slitting the wall of the bearing insert. However, the formation of the recess 41e in the inner periphery of the bearing insert requires the additional operations of removing the material after vulcanization or by providing a corresponding portion in a mold in which the insert is vulcanized if it is desired to form the recess in the insert at the time of vulcanization.

Referring now to FIG. 10, another embodiment of the invention is illustrated wherein a cylindrical bearing insert 51 having a radial slit 51b formed therein extending the length of the insert with a compression spring in the form of a strip of sponge material 52 disposed in the radial slit 51b similar to the embodiment of FIG. 2. The embodiment of FIG. 10 also has a preferably circular locking lug 51d extending radially outwardly from the outer periphery thereof and spaced longitudinally intermediate the ends of the insert. The portion of the wall of the insert immediately radially inward of the locking lug is rendered deformable by slitting the wall of the insert in a pair of spaced parallel longitudinal slits with the locking lug disposed circumferentially intermediate the spaced slits. The slits extend longitudinally a distance sufficient to render a portion of the wall deformable to the desired degree such that a strip is formed radially beneath the locking lug so that, upon applying pressure to the outer face of the locking lug, the strip is deformable radially inward thereby permitting releasable engagement of the locking lug with an aperture in the wall of a bearing housing.

Referring now to FIG. 11, the transverse cross section of the embodiment of FIG. 10 is shown which illustrates the formation of the strip by the spaced parallel slits in the wall of the bearing insert. The deformable strip 51e is shown in FIG. 11 in its relaxed state in solid line in the axial cross section of the embodiment of FIG. 10, illustrated in FIG. 12, the deformable strip 51e is shown in relaxed state by solid outline and in the deformed, or depressed, state in phantom outline. It will be noted that the embodiment of FIGS. 10, 11 and 12 permits assembly or disassembly of the insert 51 into or removal from the bearing housing only when the shaft has been removed from its journaled position against the bearing surface 51b.

Referring now to FIG. 13, an alternate form of the embodiment of FIG. 10 is shown in a transverse cross section which is similar to the view of FIG. 11. In the embodiment of FIG. 13, the insert 61 likewise has a radial slit 61b formed in the wall thereof with a spring strip of sponge material 62 disposed therein. A locking lug 61d extends radially outwardly from the surface of the insert 61 from a deformable strip portion 61e formed longitudinally in the wall of the insert. The deformable strip 61e is similar to the strip 51e in the embodiment of FIG. 10. However, the radial thickness of the strip 61e in the embodiment of FIG. 13 is rendered substantially less than the remaining portions of the wall of the insert 61 by forming a recess in the inner surface of the strip 61e.

Referring to FIG. 14, the radially thin portion of the deformable strip 61e is illustrated in enlarged axial cross section with the strip 61e shown in its deformed state in solid line and in the relaxed position by phantom outline. It will be apparent from the foregoing, that the embodiment of FIG. 13 and 14 permits the lug 61d to be radially disposed inwardly no further than the inner periphery of the bearing surfaces 61a or the surface of a shaft similar to the embodiments of FIGS. 5 and 8, while a shaft is journaled in the bearing surfaces 61a. The embodiment of FIGS. 13 and 14 thus permits the bearing insert 61 to be assembled into or removed from the bearing housing without removal of the shaft journaled in the bearing.

The present invention thus provides the unique solution to the problem of providing a unitary cylindrical bearing insert for marine propeller shaft stern tube bearings which may be assembled into and locked in the bearing housing without requiring separate rigid metal fastening expedients secured thereto. The insert of the present invention may be readily assembled into the bore of a bearing housing by virtue of a longitudinal spring strip of sponge material disposed radially in the wall of the insert which permits circumferential compression and by a locking lug extending radially outwardly of the outer periphery in the insert, which lug is readily depressed radially inwardly from releasable engagement with an aperture wall of the bearing housing.

Modifications and adaptations of the invention will be apparent to those having ordinary skill in the art and the invention, limited only by the spirit and scope of the following claims.

I claim:

1. A bearing insert adapted for assembly into a bearing housing and retention therein comprising:
    a. a cylindrical tube formed of elastomeric material having a plurality of bearing surfaces formed on the inner periphery thereof disposed in circumferentially spaced relationship with each bearing surface extending longitudinally the length of the tube, said tube having a radial slit formed through the wall thereof extending longitudinally the length of the tube;
    b. a strip of elastically deformable material having a modulus of compression substantially less than that of the said elastomeric tube disposed in said radial slit intermediate the inner and outer periphery of said tube and deformable to permit insertion of said tube into the bore of a bearing housing and upon release to spread the said inserted tube into engagement with the walls of said bore; and
    c. means including a radially extending projection formed integrally with the outer periphery of said tube extending therefrom intermediate and spaced from the ends thereof and adapted to releasably engage a corresponding recess in the wall of a bearing housing for preventing movement of the tube relative to the bearing housing.

2. The insert defined in claim 1, wherein said elastically deformable means is a strip of elastomeric sponge material bonded to at least one longitudinal face of said radial slit.

3. A tubular bearing insert of elastomeric material adapted for assembly into and retention in the bore of a bearing housing characterized in that the said insert has:
    a. a plurality of bearing surfaces formed on the inner periphery thereof disposed in circumferentially spaced relationship with each bearing surface extending longitudinally the length of the tube; and
    b. means including a radially extending projection formed integrally with the outer periphery of said tube which projection has a transverse dimension less than the axial length of the insert and extends radially outwardly therefrom and is adapted to releasably engage a corresponding recess in the bore of a bearing housing.

4. The insert defined in claim 3, wherein the projection of said means includes a lug disposed longitudinally intermediate the ends of said insert and said means also includes a deformable portion formed in the wall of said insert radially intermediate said lug and said bearing surfaces with said lug extending from the radially outer surface of said deformable portion whereby said lug is movable radially inwardly upon application of a radial force thereon.

5. The insert defined in claim 4 wherein said deformable portion has a radial thickness substantially less than the remaining portions of said insert thereby providing a recess on the radially inner periphery thereof such that said lug may be movable radially inward of the outer periphery of said insert while a shaft is journaled in the said bearing surfaces.

6. The insert defined in claim 4 wherein said deformable portion is formed by a pair of slits formed in the wall of said insert which slits are disposed in spaced parallel relationship with said lug portion disposed intermediate said slits.

7. The insert defined in claim 6, wherein said deformable portion is formed longitudinally cantilevered by a circumferentially extending slit formed in the wall of said insert which slit intersects adjacent ends of said pair of longitudinal slits and said lug means is spaced closely adjacent the free end of said cantilevered deformable portion.

8. The insert defined in claim 4, wherein said deformable portion has a radial thickness substantially less than the remaining portions of said insert and includes a recess on the radially inner periphery thereof such that said projection is movable radially inwardly of the outer periphery of said insert while a shaft is journaled in the said bearing surfaces.

9. A tubular bearing insert of elastomeric material adapted for assembly into the bore of a bearing housing and characterized in that said insert has:
    a. a plurality of bearing surfaces formed on the inner periphery thereof disposed in circumferentially spaced relationship with each bearing surface extending longitudinally the length of the tube with a radial slit formed through the wall thereof extending longitudinally the length of the tube; and,
    b. a strip of elastically deformable material having a modulus of compression substantially less than that of the said elastomeric tube disposed in said radial slit deformable to permit insertion of said tube into the bore of a bearing housing and upon release to spread the said inserted tube into engagement with the walls of said bore.

10. The insert defined in claim 9, wherein said strip is formed of elastomeric sponge material bonded to at least one longitudinal face of said radial slit.

* * * * *